D. SWAROVSKI.
PROCESS OF THE MANUFACTURE OF DECORATED GLASS PLATES OR SHAPED GLASS STONES.
APPLICATION FILED OCT. 21, 1914.

1,162,114.  Patented Nov. 30, 1915.

Witnesses:
B. W. Bommers
E. Leckert

Inventor.
Daniel Swarovski.
By Henry ___ Atty.

UNITED STATES PATENT OFFICE.

DANIEL SWAROVSKI, OF WATTENS, AUSTRIA-HUNGARY.

PROCESS OF THE MANUFACTURE OF DECORATED GLASS PLATES OR SHAPED GLASS STONES.

1,162,114.  Specification of Letters Patent.  Patented Nov. 30, 1915.

Application filed October 21, 1914. Serial No. 867,842.

*To all whom it may concern:*

Be it known that I, DANIEL SWAROVSKI, manufacturer, subject of the Emperor of Austria-Hungary, residing at Wattens, Tyrol, Austria-Hungary, have invented certain new and useful Improvements in Processes for the Manufacture of Decorated Glass Plates or Shaped Glass Stones, of which the following is a specification.

The object of the present invention is to provide a simple and efficient process for the manufacture of decorative glass plates having raised or embossed surfaces from which finished individual beads or buttons having smooth or faceted surfaces may be readily obtained.

In order to carry out the process the band-shaped, soft glass-material, after leaving the rollers, is passed between the jaws of a press, which serves to stamp or press the spherically, conically, or pyramid shaped raised portions either on one or both sides of the material, while at the same time the said jaws of the press are displaced, thereby causing a tension of that portion of the band held between the jaws of the press and the rollers.

The accompanying drawing illustrates, by way of example, the device intended to carry out the aforesaid process.

Figure 1:
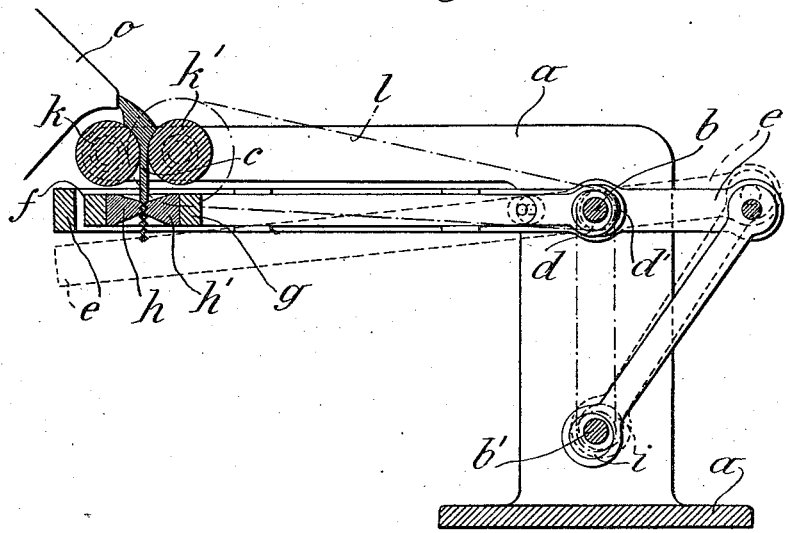
Figure 2:
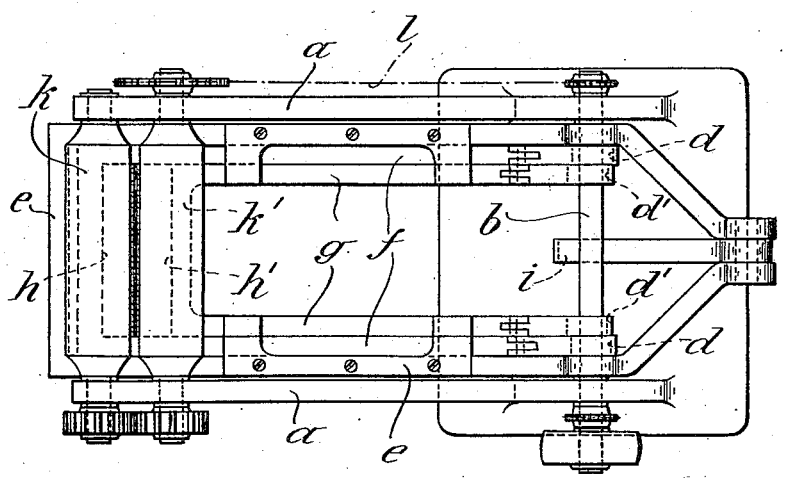

Figure 1 is a sectional side elevation; Fig. 2 is a top view of the device.

*a* are brackets of a standard in which two rollers *k*, *k'* are journaled below the outlet port of the glass-pot *o;* one of the said rollers being caused to rotate by the driving shaft *b* and by the aid of an endless chain *l* and chain wheels. The two nipper-like, movable jaws *h*, *h'* of the press, are mounted in two frames *f* and *g*, which may be moved toward and away from each other by the eccentrics *d*, *d'* fixed onto the driving-shaft, said jaws being arranged below the rollers which shape the inflowing mass of glass into a band *c*. The two frames are contained in a third frame *e* which receives an intermittent rocking motion from a rod *i'* and an eccentric *i* mounted on the shaft *b'* driven by the shaft *b*.

The arrangement of the device is such that the jaws of the press, the working face (or faces) of one or both of which is (or are) provided with indentations corresponding to the raised or embossed portions to be obtained on the surface of the material, will be moved downward after they are closed thereby causing a tension of the glass-band and will be moved back for the like distance as soon as they are opened. On moving the decorated band of glass downward it is possible to give it the shape of a flat or curved plate, of a cylinder or the like, according to the particular purpose required.

The succeeding operations of stamping or pressing, each of which will yield a row of raised ornaments, may be carried out at suitable intervals of time relatively to the displacement of the band, so that the portions of the band located between the rows of raised ornaments will be pressed and drawn throughout to a more or less thin sheet of glass. In this latter case the pressed band of glass may be broken by hand or by mechanical means and may furthermore, by the aid of jolting, by shock or the like actions, be broken up to such an extent that the raised ornamental portions having the shape of balls, buttons, smooth or faceted glass-stones will be completely severed from the surrounding glass portions and may straightway be employed for the purpose intended without requiring any further filing or final smoothening.

Articles having the form of sheets or plates may, besides the aforesaid portions, be provided with additional ornamental work by varying the interval of time between the advancing motion and the final closure of the jaws of the press, whereby there will be produced between the succeeding rows of raised ornamental work (which rows may be disposed either in straight lines or be arranged in alternate position relatively to each other) plain, unpressed strips or bands more or less broad, the width of which will be determined by the operations of pressing following each other at longer or shorter intervals of time and which will distinguish themselves both in the event of the light falling upon or passing through them by their greater depth both as regards shape and shade from the pressed sections of the plate of glass.

The present process permits of the material being worked in a single heating into articles which, either in the shape of flat or bent plates or sheets may be used for glazing, or in the form of cylindrically shaped glass accessories for electric or other light fittings, may be employed as lamp-shades or the like, while the raised portions forming the ornamental work may serve, after having been duly separated, as glass-stones for jewerly, glass-beads, glass-buttons and other various purposes.

In contradistinction to the process for the production of glass-stones hitherto in use, and in the case of which the material is first formed in the shape of small rods or bars, from which the glass-stones or the like are obtained in the shape of always one single row of a few pieces each, this prior process further requiring the material to be heated three times in succession, the present improved process offers the advantage of a considerable saving of time and labor and moreover affords the possibility of producing articles wholly novel in form and character and this in an absolutely simple and faultless manner.

What I claim is:—

1. The method, which comprises forming a sheet of glass of uniform thickness, figuring a portion of the sheet between pressing surfaces and simultaneously drawing the sheet between said surfaces and the sheet forming means, releasing the pressing surfaces, and reëngaging the sheet above the thinned portions.

2. The method, which comprises forming a sheet of glass of uniform thickness, subjecting such sheet to successive pressing actions at successive points alternating with a drawing action forming thin portions between said successive points.

In testimony whereof I have hereunto set my hand in presence of two subscribing witnesses.

DANIEL SWAROVSKI.

Witnesses:
JOSEF RULASCH,
AUGUST FUGGER.